Figure 4:
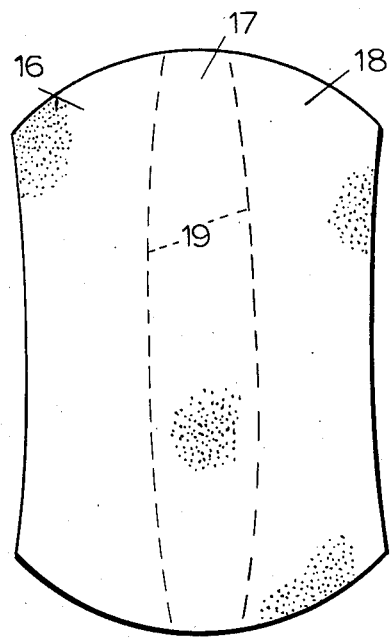

United States Patent [19]
Crook

[11] 3,721,591
[45] March 20, 1973

[54] METHOD OF MAKING INFLATABLE BALLS

[75] Inventor: John Michael Crook, Luddendenfoot, near Halifax, England

[73] Assignee: Benjamin Crook & Sons Limited, Yorkshire, England

[22] Filed: Aug. 11, 1969

[21] Appl. No.: 848,783

[30]   Foreign Application Priority Data

July 2, 1969   Great Britain.....................33,485/69

[52] U.S. Cl..................................................156/93
[51] Int. Cl. ..............................................B32b 7/08
[58] Field of Search..........156/93, 133; 273/58, 58 J, 273/58 BA; 29/148.4 B; 161/160, 229

[56]       References Cited

UNITED STATES PATENTS

| | | | |
|---|---|---|---|
| 1,788,394 | 1/1931 | Jacobsohn et al................161/229 X |
| 2,317,939 | 4/1943 | Riddell..............................156/93 X |
| 2,432,630 | 12/1947 | Purdy..................................156/133 |
| 2,579,294 | 12/1951 | Brown..................................156/93 |

*Primary Examiner*—Benjamin A. Borchelt
*Assistant Examiner*—D.A. Bent
*Attorney*—Norris & Bateman

[57]       ABSTRACT

In the production of an inflatable ball, a laminate is made of a plurality of fabric layers and a layer of plastics materials (which may be rubber or synthetic rubber). At least one of said fabric layers is impregnated with an uncured adhesive (which may be rubber). The layers are bonded together and then panels are cut from the laminate and stitched together to form the ball.

6 Claims, 7 Drawing Figures

PATENTED MAR 20 1973 3,721,591
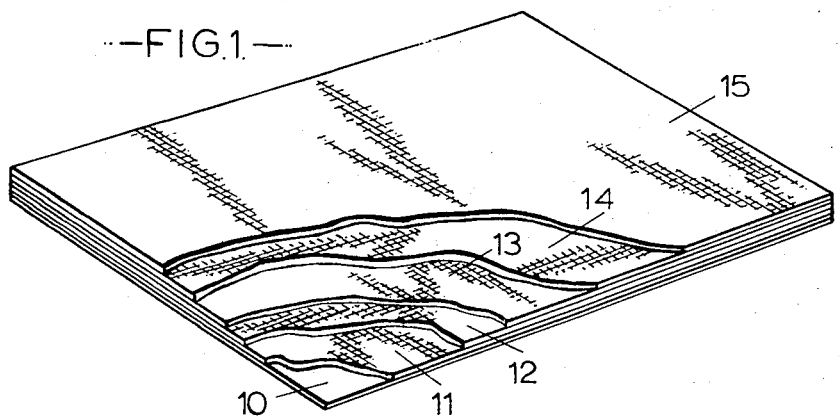
—FIG.1.—
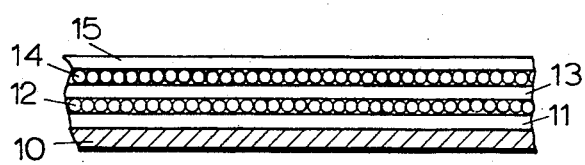
—FIG.2.—
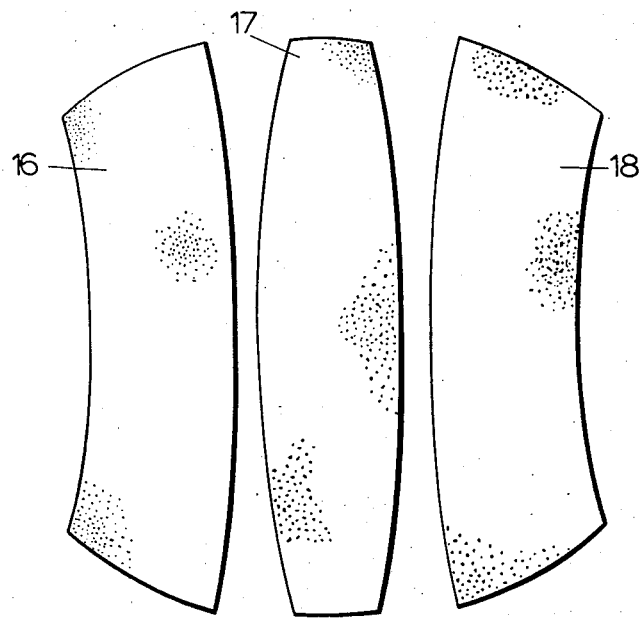
—FIG.3.—
INVENTOR:
JOHN MICHAEL CROOK
BY
Norris & Bateman PATENTED MAR 20 1973　　　　　　　　　3,721,591
SHEET 3 OF 3
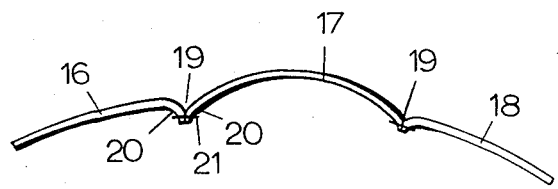
—FIG.6.—
—FIG.7.—
INVENTOR:
JOHN MICHAEL CROOK
BY

METHOD OF MAKING INFLATABLE BALLS

This invention relates to inflatable balls for games such as footballs, basketballs, water polo balls and the like. More especially, the invention is concerned with the method of manufacture, but it also includes within its scope balls manufactured in accordance with this method.

Traditionally, this type of ball has been made from leather, and, whilst it is not usual for the authorities governing the rules of the various games to stipulate that the ball shall be made of leather, it is usual for them to specify the size and weight of the ball, and these have generally been determined with leather balls under consideration. Furthermore, professional sportsmen often prefer a leather ball to one made of other materials.

For some years now, balls have been moulded in plastics materials and it is possible to produce a moulded plastics ball of the same dimensions and weight as a corresponding leather ball. It is not easy however, to produce a moulded plastics ball with the same "response" as an all leather ball. The term "response" is used to denote the bounce and flight characteristics of a ball.

Furthermore, although a moulded ball may be formed with grooves to simulate the seams formed when a multi-panel ball is stitched together, it is not practicable to form deep enough grooves in a moulded ball to correctly reproduce the flight characteristics of a stitched seam ball.

The object of this invention is to provide a method of manufacturing a ball for games, which has a similar "response" to that of a stitched multi-panel leather ball of the same size.

According to this invention a method of manufacturing an inflatable ball for games comprises bonding and simultaneously curing a plurality of fabric layers at least one of which has been impregnated with an uncured rubber-like adhesive; bonding the fabric laminate to a layer of uncured plastics material to form a composite laminate; cutting a plurality of panels from the composite laminate and switching the panels together to form the ball.

In this specification, "rubber-like adhesive" includes rubber or an adhesive having a degree of resilience when cured such as natural rubber, part natural and part synthetic rubber or wholly synthetic rubber. The term "plastics material" is used to denote rubber, synthetic rubber and synthetic plastics.

It is preferred that the fabric laminate is bonded to the plastics layer at the same operation as the bonding and curing of the fabric laminate itself; although it should be understood that the fabric laminate could be bonded and cured as a first step and then bonded to the plastics layer as a second step.

The bonding and curing of the laminate must be carried out under controlled conditions of pressure, temperature and time.

There may be three fabric layers, in which case it is preferred that the middle layer should be impregnated with uncured rubber, and in a preferred construction there are five layers of fabric in the following order:

Unimpregnated layer
Impregnated layer
Unimpregnated layer
Impregnated layer
Unimpregnated layer Thus it will be appreciated that during the bonding process the rubber from an impregnated layer flows into the unimpregnated layers on each side of it and effectively bonds all the fabric layers together.

The fabric layers may be made of woven material, in which case it is preferred to lay adjacent fabrics one on top of the other, with the warp threads of one lying at an angle to those of the other. In one construction the warp threads of one layer are parallel with the weft threads of the next adjacent layer, whilst in another construction, the warp threads of one layer are at 45° to those of the layer next adjacent to it. The latter arrangement provides maximum strain resistance in all directions.

The impregnated fabric is preferably "frictioned" that is to say, rubber or rubber substitute is forced into the fabric under pressure before the fabric is layed on the outer layer of plastics material.

Figure 5:
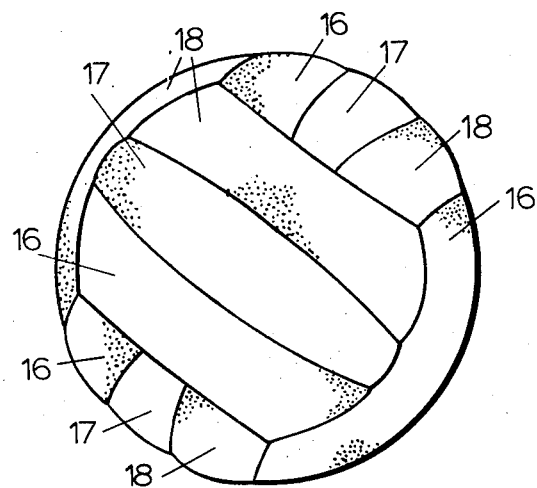

A method of manufacturing a football for Association Football (Soccer) in accordance with the invention will now be described by way of example only, with reference to the accompanying drawings, in which:

FIG. 1 is a perspective view of a laminated sheet cut away to reveal the laminations, FIG. 2 is a cross-section through the sheet shown in FIG. 1 to an enlarged scale, FIG. 3 is a plan view of three ball panels cut from the sheet shown in FIG. 1 and 2, FIG. 4 is a plan view of the three panels shown in FIG. 3 after stitching, FIG. 5 is a perspective view of a finished ball, FIG. 6 is a section through the three panels shown in FIG. 4, and FIG. 7 is a plan view of an alternative form of laminated sheet cut-away to show the construction.

In the first place laminated sheet is produced having the construction illustrated in FIG. 1. The various Laminates are: a layer of synthetic plastics material 10, a layer of woven fabric 11, a layer of frictioned woven fabric 12, a layer of woven fabric 13, a layer of frictioned woven fabric 14 and a layer of woven fabric 15.

The plastics layer 10 eventually forms the outer surface of the finished football, and must therefore be made of a material which is suitable for this purpose. It may be natural rubber or synthetic rubber or synthetic plastics. The other five layers of the laminated sheet are all woven fabrics made of textile yarns such as cotton or synthetic fibers (e.g. terylene), but they are laid one on top of another in such a way that the warp threads of one layer are at right angles to the warp threads of the adjacent layer or layers. Thus, for example, if the warp threads of the layers 11, 13 and 15 extend in a "north-south" direction, the warp threads of the layers 12 and 14 extend in an "east-west" direction. This ensures that the finished laminate is very resistant to tearing in any direction.

The fabric layers 12 and 14 are described as "frictioned" that is to say, uncured rubber or rubber substitute is forced into the fabric under pressure before the layers 12 and 14 are interleaved with the unimpregnated layers 11, 13 and 15.

When the various layers have been assembled as shown in FIGS. 1 and 2, they are placed in a press and heat and pressure are applied for sufficient time to ensure bonding of the layers to each other, due to the plastics or rubber of the layer 10 flowing into the layer 11 and due to the rubber from layers 12 and 14 flowing into the layers 11, 13 and 15. The pressure also forms the laminated layer into a flat sheet, and heat cures the rubber and/or plastics material, so that when the laminate is removed from the press, it is a single sheet.

The pressure, temperature and duration of application of the pressure and heat must all be controlled, and in one particular example a pressure of 1200 pounds per square inch and a temperature of 145° C. are applied for a period of 4 minutes.

Shaped panels 16, 17 and 18 (FIG. 3) are then cut from the flat sheet and for a single ball six of each of these sections are required (i.e. to produce the well known eighteen panel ball). These three panels 16, 17 and 18 are then stitched together by the conventional method to produce a ball section as shown in FIGS. 4 and 6 with relatively deep seams 19 due to the edges 20 of the panels being inturned to receive the stitches 21. Finally, the six sections are sewn together again using the known technique to produce the finished ball shown in FIG. 5.

Inflatable balls such as footballs have for many years been made of panels of leather stitched together. It will be noted however that although the present invention employs the method of forming panels which are subsequently stitched together, no leather is used in the process. However, the weight of the constituents of the complete laminate can be so arranged as to produce a ball within the same weight limitations as those prescribed by the appropriate authorities for a leather ball of equivalent circumference, and it has also been found possible to produce a ball by the above methods with substantially the same response as an all leather ball.

Another arrangement of the woven fabric layers is illustrated in FIG. 7. Only two layers 22 and 23 are shown, but it will be appreciated that this method could be applied to greater numbers of layers (e.g. the five fabric layers of FIGS. 1 and 2). In the layer 22, the warp threads extend north-south and the weft threads east-west, but in the layer 23, the warp threads extend north-east, south-west and the weft threads north-west south-east. In other words the warp threads of one layer are at 45° to those of the adjacent layer.

In the example there are five layers of woven fabric in the laminate, but it should be understood that there may be two or more layers. Providing thick enough fabric layers can be produced only two may be adequate, or for some purposes more than five layers could be employed. Further if there are three or more layers then the warp threads of one could be at 90° to those of another and the warp threads of the third at 45° to those of the first two.

I claim:

1. A method of manufacturing an inflatable game ball comprising arranging a plurality of fabric layers in superposed relationship, with at least one of said fabric layers being impregnated with an uncured rubber-like adhesive; bonding and simultaneously curing said fabric layers together to form a fabric laminate; bonding an outer layer of uncured plastic material to said fabric laminate to form a composite laminate; cutting a plurality of ball panels from said composite laminate; and stitching said panels together to produce a ball, the outer surface of which is formed by said outer layer of plastics material on said panels and by the stitched seams securing the panels together.

2. A method according to claim 1, wherein said outer layer of plastics material and said fabric layers are simultaneously bonded together to form said composite laminate in a one-step operation.

3. A method according to claim 1, wherein said fabric laminate is bonded and cured as a first step, and said fabric laminate is bonded to said layer of plastics material in a subsequent step.

4. A method according to claim 1, wherein there are three fabric layers and the middle layer is impregnated with uncured rubber, the outer layers being unimpregnated.

5. A method according to claim 1, wherein there are five fabric layers and the second and fourth layers are impregnated with uncured rubber and the first, third and fifth layers are unimpregnated.

6. A method according to claim 1, in which adjacent layers of fabric have their respective sets of warp threads disposed at an angle to each other.

* * * * *